3,769,357
PREPARATION OF NITROCYCLOPROPANE FROM NITROMETHANE AND A 1,2-DIHALOETHANE

John D. Bacha and Charles M. Selwitz, Borough of Monroeville, Pa., assignors to Gulf Research & Development Company, Pittsburgh, Pa.
No Drawing. Filed Feb. 5, 1973, Ser. No. 329,568
Int. Cl. C07c 79/08
U.S. Cl. 260—644                              10 Claims

ABSTRACT OF THE DISCLOSURE

Nitrocyclopropane is prepared by reacting nitromethane and a 1,2-dihaloethane in the presence of a base and a polar, aprotic solvent. Nitromethane and 1,2-dibromoethane react in dimethyl sulfoxide in the presence of potassium carbonate with the production of nitrocyclopropane.

---

This invention relates to a method of making nitrocyclopropane. More particularly, this invention relates to a method of making nitrocyclopropane by the reaction of nitromethane and a 1,2-dihaloethane in the presence of a base and a polar, aprotic solvent.

Nitrocyclopropane has been made in low yield by the direct nitration of cyclopropane. Nitrocyclopropane has also been made by the ring closure of 3-iodo-1-nitropropane in a multistep process. We have discovered a method of making nitrocyclopropane in a single step from readily available, moderately priced reactants, namely, nitromethane and a 1,2-dihaloethane. Our invention is, in part, based on the discovery that this ring-forming reaction takes place at moderate conditions in the presence of a base and a polar, aprotic solvent.

We prefer 1,2-dibromoethane as the 1,2-dihaloethane for reaction with the nitromethane for the production of nitrocyclopropane by our process. This reaction produces hydrogen bromide as a by-product which can be quantitatively oxidized to free bromine for reaction with ethylene to produce additional 1,2-dibromethane for the described reaction. By utilizing this bromine recovery procedure, ethylene and nitromethane can be the true feed materials to the overall process. Next preferred as the 1,2-dihaloethane process reactant is 1,2-bromochloroethane. In addition, 1,2-dichloroethane will react with nitromethane to produce nitrocyclopropane by the process described herein.

Polar, aprotic solvents which are useful in the process described herein include the sulfoxides, the sulfones, the di-N-substituted carboxylic acid amides, the N-substituted pyrrolidones, and the like. The sulfoxides are defined by the formula $R_1(R_2)S:O$ in which $R_1$ and $R_2$ are independently selected from lower alkyl, phenyl and benzyl, and chlorine substituted derivatives thereof. Dimethyl sulfoxide is the preferred sulfoxide. Also useful are diethyl sulfoxide, di-n-propyl sulfoxide, di-n-butyl sulfoxide, di-2-chloroethyl sulfoxide, diphenyl sulfoxide, methyl phenyl sulfoxide, benzyl phenyl sulfoxide, dibenzyl sulfoxide, and the like. The sulfones are defined by the formula $R_3(R_4)SO_2$ in which $R_3$ and $R_4$ are independently selected from lower alkyl and can be joined together to form a cyclic compound having from three to eight members in the ring. Sulfolane also known as tetramethylene sulfone is the preferred sulfone. Also useful are dimethyl sulfone, diethyl sulfone, trimethylene sulfone, pentamethylene sulfone, hexamethylene sulfone, and the like.

The di-N-substituted carboxylic acid amides are defined by the formula $R_5CONR_6(R_7)$ in which $R_5$ is hydrogen or lower alkyl and $R_6$ and $R_7$ are independently lower alkyl. Preferred di-N-substituted carboxylic acid amides are dimethyl formamide and dimethyl acetamide. Also useful are diethyl formamide, diethyl acetamide, di-n-propyl acetamide, di-t-butyl acetamide, dimethyl butyramide, dimethyl propionamide, and the like. The useful N-substituted pyrrolidones include the N-lower alkyl alpha and beta pyrrolidones. Preferred are N-methyl pyrrolidone and N-ethyl pyrrolidone. Other polar, aprotic solvents are useful herein such as hexamethylenephosphoramide and the like. As used herein, lower alkyl includes alkyl groups having from one to about four carbon atoms. Suitable mixtures of two or more polar, aprotic solvents can also be used.

Any alkali metal or magnesium carbonate, bicarbonate, hydroxide, lower alkoxide, fluoride, or lower alkyl carboxylate; or calcium, barium or strontium oxide or hydroxide; or ammonium carbonate, hydroxide, fluoride or lower alkyl carboxylate, or a mixture thereof can be used as the base in this system. We prefer potassium carbonate and sodium carbonate. Although the specified fluorides are not generally considered to be bases, they possess useful basic properties when dissolved in the polar, aprotic solvent and are therefore defined as bases herein. Although we mean to include lithium, sodium, potassium, rubidium and cesium as alkali metals herein, we prefer the first three members of the group and particularly potassium and sodium due to availability and moderate cost. The alkoxides have from one to about four carbon atoms and include the methoxide, ethoxide, propoxide, t-butoxide, and the like. The lower alkyl carboxylates have up to about four carbon atoms and include acetate, propionate, isobutyrate, and the like.

Also useful as the base for reaction in this process is a primary, secondary or tertiary alkyl or cycloalkyl amine in which each alkyl group independently has from one to about eight carbon atoms and each cycloalkyl group contains from five to six carbon atoms. Useful amines include monomethylamine, dimethylamine, trimethylamine, triethylamine, isopropylamine, n-butylamine, cyclohexylamine, n-octylamine, and the like.

The reaction of the nitromethane and the 1,2-dihaloethane is a liquid phase reaction carried out in the polar, aprotic solvent with the reactants dissolved in the solvent. This requires that the base and the solvent be suitably selected to insure that the base which is used is sufficiently soluble in the desired, polar, aprotic solvent to effect reaction at a suitable rate. The base is also involved as a reactant in this system.

The temperature for carrying out the reaction is not critical. At too low a temperature the reaction occurs at an impractical rate, while at too high a temperature undesired decomposition becomes important. Since the reaction rate increases as the temperature increases, an elevated temperature can in many instances be advantageously employed. Also, an elevated temperature may be preferred with certain combinations of base and polar, aprotic solvent to increase the solubility of the base in the solvent. In view of this, a broad temperature range of about 15° to about 160° C. is useful.

The reaction can be carried out at atmospheric pressure or at lower or higher pressures. Operation at atmospheric pressure or pressures lower than atmospheric offer advantages. At pressures lower than atmospheric, a semi-continuous mode of operation can be employed, that is, the product is removed as it is formed. In this semi-continuous procedure the nitromethane and the 1,2-dihaloethane can be slowly introduced into a reactor which contains the polar, aprotic solvent and the base. The temperature-pressure relationship in the reactor is maintained at a level sufficient to vaporize the nitrocyclopropane for removal as it is formed.

It is also a desirable procedure to carry out the reaction at an elevated pressure such as by charging the reactants including the base and polar, aprotic solvent to a closed reactor in a batch-type reaction. Autogenous pressure is conveniently used in this batch reactor. Alternatively, the reaction can be carried out as a continuous reaction by introducing the base, the nitromethane, the 1,2-dihaloethane and the polar, aprotic solvent into an elongated reactor in which the reaction temperature is maintained as the reaction mixture progresses to the outlet. In this continuous procedure the pressure in the reactor is controlled by the temperature and the relative rates at which the reactant mixture is fed to the reactor and the product mixture is metered out of the reactor. Because of apparatus and equipment costs, a maximum pressure lower than about 500 p.s.i. (about 35 kg. per sq. cm.) is preferred, although higher pressures can be used if desired.

The relative proportions of the nitromethane, the 1,2-dihaloethane, the base and the polar, aprotic solvent that are used are not critical to obtaining reaction. However, it is desirable to maintain the relative amounts within limits for greater efficiency. With this in consideration, the molar ratio of 1,2-dihaloethane to nitromethane can suitably be between about 0.1:1 and about 10:1. The molar ratio of 1,2-dihaloethane to the base can suitably be between about 0.1:1 and about 5:1. The ratio of the polar, aprotic solvent in liters to the base in mols can suitably be between about 0.5:1 and about 10:1. And the ratios of the polar, aprotic solvent in liters to the 1,2-dihaloethane in mols can suitably be between 0.1:1 and about 40:1.

The following examples are set out to illustrate the novel process of the invention and to provide a better understanding of its details and advantages.

EXAMPLE 1

A 100 ml. flask was charged with 70 ml. of dimethyl sulfoxide, 4.4 grams (32 mmols) of powdered potassium carbonate, 16.0 mmols of nitromethane and 8.0 mmols of 1,2-dibromoethane with stirring. After four hours at 26° C., analysis disclosed that the conversion of 1,2-dibromoethane was 45 percent at an efficiency of 9.8 percent to nitrocyclopropane.

EXAMPLE 2

A 100 ml. flask was charged with 70 ml. of dimethyl sulfoxide, 64 mmols of powdered potassium carbonate, 40.0 mmols of nitromethane and 8.0 mmols of 1,2-dibromoethane with stirring. After 2.5 hours at 26° C. analysis disclosed a 45 percent conversion of 1,2-dibromoethane at an efficiency to nitrocyclopropane of 7.1 percent and analysis after an additional 2.5 hours at 26° C. showed a total conversion of 1,2-dibromoethane of 62 percent at an overall efficiency to nitrocyclopropane of 6.8 percent.

EXAMPLE 3

A 100 ml. flask was charged with 73 ml. of dimethyl sulfoxide containing 3 ml. of water, 64 mmols of powdered potassium carbonate, 40.0 mmols of nitromethane and 8.0 mmols of 1,2-dibromoethane with stirring. After three hours at 26° C. analysis disclosed a 50 percent conversion of 1,2-dibromoethane at an efficiency to nitrocyclopropane of 8.3 percent and analysis after an additional three hours at 26° C. showed a total conversion of 1,2-dibromoethane of 63 percent at an overall efficiency to nitrocyclopropane of 7.8 percent.

EXAMPLE 4

A 100 ml. flask was charged with 70 ml. of dimethyl sulfoxide, 20 mmols of potassium hydroxide, 40.0 mmols of nitromethane and 8.0 mmols of 1,2-dibromoethane with stirring. After three hours at 26° C. analysis disclosed an 80 percent conversion of 1,2-dibromoethane at an efficiency to nitrocyclopropane of 10.5 percent and analysis after an additonal three hours at 26° C. showed a total conversion of 1,2-dibromoethane of 91 percent at an overall efficiency to nitrocyclopropane of 10.4 percent.

Other experiments were carried out in the general manner described above using dimethyl sulfoxide as the polar, aprotic solvent, potassium carbonate as the base, nitromethane and separately, 1,2-dichloroethane and 1,2-bromochloroethane with the production of nitrocyclopropane.

Nitrocyclopropane is produced in like manner when 1,2-bromochloroethane and nitromethane are reacted in the presence of sodium methoxide and sulfolane, when 1,2-dichloroethane and nitromethane are reacted in the presence of magnesium bicarbonate and dimethylformamide, when 1,2-dibromoethane and nitromethane are reacted in the presence of ammonium acetate and N-methyl pyrrolidone, when 1,2-dibromoethane and nitromethane are reacted in the presence of trimethylamine and hexamethylenephosphoramide, when 1,2-dibromoethane and nitromethane are reacted in the presence of potassium fluoride and dimethyl acetamide, when 1,2-dibromoethane and nitromethane are reacted in the presence of sodium methoxide and diethyl sulfoxide, when 1,2-dibromoethane and nitromethane are reacted in the presence of calcium hydroxide and dimethyl sulfoxide, and the like.

It is to be understood that the above disclosure is by way of specific example and that numerous modifications and variations are available to those of ordinary skill in the art without departing from the true spirit and scope of our invention.

We claim:

1. A method for preparing nitrocyclopropane which comprises reacting nitromethane and a 1,2-dihaloethane in the presence of a base selected from alkali metal or magnesium carbonate, bicarbonate, hydroxide, lower alkoxide, fluoride or lower alkyl carboxylate; or calcium, barium or strontium oxide or hydroxide; or ammonium carbonate, hydroxide, fluoride or lower alkyl carboxylate; or primary, secondary or tertiary alkyl or cycloalkyl amine in which each alkyl group has from one to about eight carbon atoms and each cycloalkyl group contains from five to six carbon atoms in a polar, aprotic solvent at a temperature between about 15° and about 160° C.

2. A method in accordance with claim 1 in which the polar, aprotic solvent is a sulfoxide defined by the formula $R_1(R_2)S:O$ in which $R_1$ and $R_2$ are independently selected from lower alkyl, phenyl or benzyl, or chlorine substituted derivatives thereof; a sulfone defined by the formula $R_3(R_4)SO_2$ in which $R_3$ and $R_4$ are independently selected from lower alkyl and can be joined together in a cyclic compound having from three to eight members in the ring; a di-N-substituted carboxylic acid amide defined by the formula $R_5CONR_6(R_7)$ in which $R_5$ is hydrogen or lower alkyl and $R_6$ and $R_7$ are independently lower alkyl; an N-lower alkyl alpha or beta pyrrolidone; hexamethylenephosphoramide; or a mixture thereof.

3. A method for preparing nitrocyclopropane in accordance with claim 1 in which the polar, aprotic solvent is dimethyl sulfoxide.

4. A method in accordance with claim 1 in which the 1,2-dihaloethane is 1,2-dibromoethane; 1,2-bromochloroethane or 1,2-dichloroethane.

5. A method in accordance with claim 4 in which the 1,2-dihaloethane is 1,2-dibromoethane.

6. A method in accordance with claim 1 in which the molar ratio of 1,2-dihaloethane to nitromethane is between about 0.1:1 and about 10:1.

7. A method in accordance with claim 1 in which the molar ratio of 1,2-dihaloethane to the base is between about 0.1:1 and about 5:1.

8. A method in accordance with claim 1 in which the ratio of the polar, aprotic solvent in liters to the base in mols is between about 0.5:1 and about 10:1.

9. A method in accordance with claim 1 in which the ratio of the polar, aprotic solvent in liters to the 1,2-dihaloethane in mols is between about 0.1:1 and about 40:1.

10. A method for preparing nitrocyclopropane which comprises reacting 1,2-dibromoethane and nitromethane in the presence of the carbonate or hydroxide of sodium or potassium in dimethyl sulfoxide at a temperature between about 15° and about 160° C.

References Cited

UNITED STATES PATENTS

| | | | |
|---|---|---|---|
| 3,100,805 | 8/1963 | Bay | 260—644 |
| 3,100,806 | 8/1963 | Bay | 260—644 |

OTHER REFERENCES

Rodd's Chemistry of Carbon Compounds, S. Coffey, editor, 2nd ed., vol. II, part A, Elsevier Pub. Co., London, 1964, p. 45.

LELAND A. SEBASTIAN, Primary Examiner